3,014,332
DOFFING MECHANISM FOR COTTON PICKER
Arthur L. Hubbard, Des Moines, Iowa, assignor to Deere
 & Company, Moline, Ill., a corporation of Delaware
Filed Sept. 4, 1959, Ser. No. 838,169
2 Claims. (Cl. 56—41)

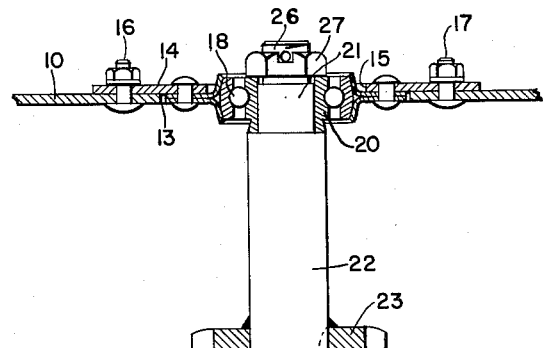

This invention relates to a doffing mechanism for a cotton picker and more particularly to an improvement in means for supporting the doffing mechanism in the cotton picker.

The present doffing mechanism may be of the type used in a cotton picker shown and described in U.S. Patent 2,672,001 issued to a Edward C. Bopf and Fred A. Thomann, March 16, 1954. The cotton picker there shown is of the type having a cotton picking drum mounted on an upright axis with a plurality of columns provided with a series of vertically spaced and laterally extending cotton picker spindles. The drum is arranged on a mobile frame so that as the machine advances, the spindles will move into the plants of cotton and pick the cotton therefrom. The drum is rotated so as to move the picker spindles from a position within the cotton plant inwardly of a housing containing the doffing mechanism which serves to dislodge the cotton bolls from the spindles. The doffing means comprises an upright shaft on which is a plurality of disks or equivalent means spaced apart vertically on the order of the spacing of the series of layers of spindles. The purpose of each doffer and each doffing mechanism is to engage the cotton on the associated spindles and to remove the cotton by wiping or brushing the cotton from the spindles. The principles as above outlined are well-known throughout the industry and have conventionally been used for several years.

There are, of course, several problems which are inherent in a doffing mechanism of the above described type. Primarily among these is the fact that the part of the doffer which normally wipes the cotton from the cotton spindles must of necessity be of a soft or otherwise flexible material in order not to injure the relatively expensive cotton picking spindles. Also, in order to insure complete doffing of the cotton from the spindles, the entire doffing mechanism must rotate at a relative high rate of rotation thereby requiring high-quality bearings which must be fixed to the picker housing or supporting structure. Consequently as the soft or flexible wiping material of the doffer wears, there is a requirement that the entire doffing mechanism be adjusted vertically so that the doffer plates or disks come in proper vertical position relative to their respective rows of picking spindles. Therefore, it is necessary to provide a vertical adjustment of the doffer mechanism which will place the doffer plates and the doffer pads in correct relationship to the spindles. In the past, there have been various methods of doing this, all of which were somewhat complicated, with the adjustment taking place in an area either remote from the doffing mechanism per se or in an area which was rather difficult to reach, thereby making the adjustment rather tedious and difficult.

It is the primary object of the present invention to provide a new and novel doffing mechanism featuring upright shaft means with radially extending doffer plates which may be adjusted vertically with a minimum amount of effort, which may be adjusted at a location adjacent the doffer and spindle mechanisms, and which is of a simple and relatively inexpensive design.

It is a further object of the present invention to provide a doffer mechanism having an upright central shaft means which is split into two sections, an upper drive section and a lower doffer section, and which are interconnected by adjoining threaded ends for adjustment axially relative to one another. Thus by holding the drive shaft, the lower shaft and its doffer plates may be adjusted vertically relative to the upper shaft and picker spindles to a desired location. Detachable lock means are provided to prevent relative rotation between the upper drive shaft and the lower doffer shaft.

Other objects and advantages of the present invention will become apparent to those skilled in the art as the nature of the invention is better understood from the following disclosure and as shown in the accompanying drawings.

FIG. 1 is a vertical and partial sectional view taken through the doffing mechanism showing part of the picker housing and associated picker spindles.

FIG. 2 is a sectional view taken substantially along the line 2—2 of FIG. 1.

FIG. 3 is a sectional view taken substantailly along the line 3—3 of FIG. 2.

Referring now to FIG. 1, there is provided an upper housing wall or supporting structure 10 and a lower wall or supporting structure 11, the latter wall or supporting structure 11 being generally open to permit trash to gravitate from the picker housing. The upper wall 10 is provided with a circular opening 13 and overlying annular plate 14, having an inner annular edge 15 inwardly of the opening 13 bolted at 16, 17 to the upper wall 10. The plate 14 carries a bearing, indicated in its entirety by the reference numeral 18, by means of a circular row of rivets 19. The bearing 18 is of the ball-bearing type having an inner race 20 which receives a radially recessed upper end 21 of an upper drive shaft 22. The drive shaft 22 is provided with a sprocket 23 which is a terminal end of the main drive means for rotating the shaft 22. The lower end of the drive shaft 22 has a threaded axial bore 24 which opens downwardly. The outer periphery of the drive shaft 22 is provided with an axial keyway 25. The upper end of the drive shaft 22 is threaded as at 26 and extends upwardly from the bearing or journal means 18 and is held against vertical or axial movement by means of a nut 27.

A lower vertically disposed doffer shaft, indicated by reference numeral 30, is alined axially with the upper drive shaft 22 and defines generally a lower continuation of the drive shaft 22. The lower end of the shaft 30 is mounted on the lower frame structure 11 by means of an upwardly opening cup structure 31 having radial flanges 32 bolted as at 33 to the supporting structure 11. The cup 31 has an annular internal axial face 34 which receives for axial movement relative thereto the outer race 35 of bearing or journal means 36. The bearing 36 also has an inner race 37 which receives a lower recessed end 38 of the doffer shaft 30. The lower terminal end of the shaft 30 is threaded at 39 to receive a bolt 40 which locks the bearing 36 on the shaft 30. The shaft 30 is further provided with a radially recessed portion 41 which receives a hub 42 of a flange member 43. The flange member 43 has an axially extending annular wall 44 which overlies the upper end of the cup member 31. An annular sealing gasket 45 extends between the inner surface of the annular wall 44 and the outer surface of the cup member 31. The cup member 31 has a shoulder 46 on which the seal 44 may seat itself. As may be seen from viewing FIG. 1, the annular wall 34 of cup member 31 and the internal face of the annular wall 44 have axial length so that the bearing 36, shaft 30, and flange member 43 may be moved axially relative to the supporting frame 11.

Supported on the shaft 30 are a plurality of vertically spaced doffer plates 50, each plate 50 having an internal hub portion 51 adjacent the shaft 30 and provided with an internal axial keyway 52. The shaft 30 is provided with a vertical slot which receives a key 53, which also seats in the keyway 52 and thereby locks the shaft 30 and doffer plates against relative rotation. The hub portion 51 is of such length that the hubs of the adjacent plates may be stacked on top of one another and will provide correct spacing between the plates 50 and provide a uniform and continuous column of doffer plates 50. The lower of the plates 50 rests against the upper surface of the flange member 43. The upper of the plates 50 is held against upward or axial movement by means of a fixed annular wall 55 which is welded, as at 56, or otherwise fixed to the shaft 30. Provided on the outer peripheries of the plates 50 are depending wiper pads 58 which contact the picking ends of harvester spindles 59 and generally wipe the cotton from the spindles.

The upper end portion of the shaft 30 is provided with diametrically oppositely disposed vertical keyways 65, 70 and has at its extreme upper end an upwardly projecting threaded plug or end 71 which is received in the threaded bore 24 of the shaft 22 and operates as means connecting the two shafts 22, 30. The shaft 30 is the same diameter as the upper shaft 22 and consequently the end plug 71 is of a smaller diameter than either the shafts 22, 30. Unless otherwise restricted, it becomes apparent that the lower doffer shaft 30 may be moved vertically relative to the upper drive shaft 22 simply by rotating the lower shaft 30 so that the threaded end 71 will be adjusted in the bore 24. Consequently should the doffer pads 58 become worn, the doffer shaft 30 may be moved downwardly by screwing the end 71 out of the bore 24 until the doffer pads are suitably positioned relative to the spindles 59.

A piloting collar or ring 75 is provided to overlie the adjoining lower end of the drive shaft 22 and the upper portion of the doffer shaft 30 and is rigidly fixed by welding 76 to upper shaft 22. The piloting collar 75 has an internal surface which lies adjacent to both the shaft 22 and 30 and consequently offers a rigid support between the adjoining ends of the shafts 22, 30. The collar 75 is provided with an internal axial keyway 77 which is normally in radial alinement with one of the keyways 65, 70 and when in alinement will receive the lower end of a key 78. The key 78, when positioned as shown in FIG. 1, will, of course, lock the shafts 22, 30 against rotation relative to one another. Therefore, the position of the doffer shaft 30 and its associated doffer plates 50 will be fixed relative to the spindles 59 until it is desired to readjust the vertical location of the plates 50 whereupon the key 78, which is detachable, may be removed to permit the lower shaft 30 to be screwed vertically to the desired new location. Consequently the collar 75 and the associated keyways and the key 78 operate as means locking the shafts 22, 30 against relative rotation. The upper end of the lower shaft 30 is provided with diametrically opposite keyways 65, 70 in order that the shaft 30 may be locked after each half revolution of adjustment. It generally would appear obvious that numerous other keyways could be positioned around the shaft 30 in order to insure more minute adjustment if such was required. Since the two shafts 22, 30 are rigidly joined at their adjoining ends by the collar, the lower bearing 36 in effect journals the shaft 22 and the upper bearing 18 journals the doffer shaft 30 to the respective supporting structures 11, 10.

While only one form of the invention has been shown, it should be recognized that other forms and variations will occur to those skilled in the art. Therefore, it should be understood that the present discription and disclosure was shown in detail for purposes of clearly and concisely illustrating the principles of the invention and not for the purpose of limiting or narrowing the invention beyond the broad concept set forth in the appended claims.

I claim:

1. Adjustable supporting structure for vertically positioning a doffing mechanism in a cotton harvester having vertically spaced picking spindles and a main supporting structure comprising: a pair of axially alined shafts including a vertically disposed upper drive shaft with journal means connecting it to the supporting structure and having at its lower end a threaded axial bore, and a vertically disposed lower doffer supporting shaft having an upper end portion with a radially recessed and threaded end adjustably carried in the threaded bore of the drive shaft, the doffer shaft and the doffing plates supported thereon thereby being adapted for axial adjustment relative to the drive shaft by rotating one shaft relative to the other shaft; journal means on the supporting structure supporting the lower end of the doffer shaft, said latter journal means permitting free axial movement of the doffer shaft whereby said drive shaft will suspend the doffer shaft; a piloting collar overlying the adjoining ends of the shafts; and detachable means between the collar and shafts for preventing relative rotation between the two shafts.

2. Adjustable supporting structure for vertically positioning a doffing mechanism in a cotton harvester having vertically spaced picking spindles and a main supporting structure comprising; a vertically disposed upper drive shaft journaled at its upper end to the supporting structure and restrained against axial movement and having a lower end with a downwardly opening axial bore; drive means connected to and for rotating the drive shaft about its axis; a lower vertically disposed doffer supporting shaft alined axially with the upper drive shaft and defining a lower continuation thereof, the lower shaft having an upper portion inserted in said bore of the drive shaft, connecting means between the upper portion of the doffer shaft and the bore whereby axial adjustment between the shafts in response to relative rotation between the shafts will occur, the doffer shaft further having a plurality of angularly spaced external axial grooves; journal means on the supporting structure supporting the lower end of the shaft, said journal means permitting axial movement of the doffer shaft; a piloting collar rigid with the lower end of the drive shaft and overlying the upper portion of the doffer shaft, the collar having an internal axial groove; and a key adapted to seat in the internal axial groove and one of the external grooves of the doffer shaft for preventing relative rotation between the two shafts.

References Cited in the file of this patent

UNITED STATES PATENTS

| | | |
|---|---|---|
| 1,926,337 | Johnston | Sept. 12, 1933 |
| 2,664,688 | Nickla | Jan. 5, 1954 |
| 2,711,066 | Barbknecht | June 21, 1955 |
| 2,821,419 | Walton | Jan. 28, 1958 |
| 2,843,408 | Stukenborg | July 15, 1958 |
| 2,895,756 | Gair | July 21, 1959 |